US011811263B2

(12) United States Patent
Wang et al.

(10) Patent No.: US 11,811,263 B2
(45) Date of Patent: Nov. 7, 2023

(54) POWER CONVERSION METHOD, APPARATUS, AND DEVICE, AND MEDIUM (71) Applicant: GREE ELECTRIC APPLIANCES, INC. OF ZHUHAI, Zhuhai (CN)

(72) Inventors: Jing Wang, Zhuhai (CN); Shiyong Jiang, Zhuhai (CN); Wu Wen, Zhuhai (CN); Keqin Liu, Zhuhai (CN); Peng Ren, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 189 days.

(21) Appl. No.: 17/298,416

(22) PCT Filed: Jun. 13, 2019

(86) PCT No.: PCT/CN2019/091072
§ 371 (c)(1),
(2) Date: May 28, 2021

(87) PCT Pub. No.: WO2020/107860
PCT Pub. Date: Jun. 4, 2020

(65) Prior Publication Data
US 2022/0123583 A1 Apr. 21, 2022

(30) Foreign Application Priority Data
Nov. 30, 2018 (CN) .......................... 201811456564.0

(51) Int. Cl.
*H02J 9/06* (2006.01)
*H02M 1/10* (2006.01)
(Continued)

(52) U.S. Cl.
CPC .............. *H02J 9/061* (2013.01); *H02M 1/10* (2013.01); *H02M 7/066* (2013.01); *H02M 7/219* (2013.01)

(58) Field of Classification Search
CPC .......... H02J 9/061; H02M 1/10; H02M 7/066; H02M 7/219; H02M 5/02; H02M 5/275; H02M 5/293
See application file for complete search history.

(56) References Cited

U.S. PATENT DOCUMENTS 9,742,303 B2 *  8/2017  Donescu ............... H02M 7/493
9,966,792 B2     5/2018  Mahant Shetti
(Continued)

FOREIGN PATENT DOCUMENTS

CA      3 121 401 A1     6/2020
CN         10149968 A    8/2009
(Continued)

OTHER PUBLICATIONS

International Search Report dated Sep. 27, 2019 in PCT/CN2019/091072 (with English Translation ), 4 pages.
(Continued)

*Primary Examiner* — Gary L Laxton
(74) *Attorney, Agent, or Firm* — Oblon, McClelland, Maier & Neustadt, L.L.P.

(57) ABSTRACT

The present invention provides a power conversion method, apparatus, and device, and a medium. The power conversion apparatus comprises: a configurable input interface, a power conversion circuit, and a configurable output interface. The configurable input interface is provided to configure a first electrical connection mode between an input power supply and the power conversion circuit, and to electrically connect the input power supply to the power conversion circuit. The configurable output interface is provided to configure a second electrical connection mode between a load and the power conversion circuit, and to electrically connect the load to the power conversion circuit. The power conversion circuit is provided to perform corresponding power conversion according to a parameter of the input power supply and
(Continued)

a parameter of the load. Embodiments of the present invention resolve the problem in the related art of poor general applicability of a power conversion apparatus, thereby improving the general applicability of the power conversion apparatus.

12 Claims, 2 Drawing Sheets

(51) Int. Cl.
*H02M 7/06* (2006.01)
*H02M 7/219* (2006.01)

(56) References Cited

U.S. PATENT DOCUMENTS

| | | |
|---|---|---|
| 2002/0109412 A1 | 8/2002 | Johnson, Jr. |
| 2002/0118556 A1 | 8/2002 | Johnson, Jr. |
| 2013/0039104 A1 | 2/2013 | Sharma |
| 2013/0293012 A1 | 11/2013 | Song et al. |
| 2014/0070611 A1* | 3/2014 | Fernandez .......... H02M 1/4266 307/31 |
| 2016/0141917 A1 | 5/2016 | Mahant Shetti |
| 2017/0346386 A1 | 11/2017 | Sharma |
| 2019/0036366 A1* | 1/2019 | Dohmeier ............... B60L 53/24 |
| 2020/0014239 A1* | 1/2020 | Liu ......................... H02M 1/08 |

FOREIGN PATENT DOCUMENTS

| | | |
|---|---|---|
| CN | 106899195 A | 6/2017 |
| CN | 107612033 A | 1/2018 |
| CN | 109672321 A | 4/2019 |
| WO | WO 2016/176917 A1 | 11/2016 |

OTHER PUBLICATIONS

Search Report and Written Opinion dated Oct. 5, 2022, in corresponding Singaporean Patent Application No. 11202105703U, 9 pages.

Extended European Seach Report dated Dec. 15, 2021 in European Patent Application No. 19889876.9, 9 pages.

* cited by examiner

POWER CONVERSION METHOD, APPARATUS, AND DEVICE, AND MEDIUM

CROSS-REFERENCE TO RELATED DISCLOSURES

The present disclosure is a U.S. National Stage Application under 35 U.S.C. 371 of International Patent Application No. PCT/CN2019/091072, filed on Jun. 13, 2019, which is based on and claims the priority to the Chinese Patent Application No. 201811456564.0 filed on Nov. 30, 2018, both of which are hereby incorporated by reference in its entirety into the present disclosure.

TECHNICAL FIELD

The present disclosure relates to the field of power conversion, and in particular, to a power conversion method, apparatus, device, and medium.

BACKGROUND

Since systems such as photovoltaic power generation system, wind power generation system, solar power generation system, or AC power grid provided in the related art are configured very differently, and there are many corresponding power conversion apparatuses that cannot be used universally, power apparatuses used with the systems are complex and have poor universality and maintainability.

SUMMARY

At least some embodiments of the present disclosure provide a power conversion method, apparatus, device, and medium, so as to at least partially solve the problem of poor universality of the power conversion apparatus in the related art.

In an embodiment of the present disclosure, there is provided a power conversion apparatus comprising: a configurable input interface, a power conversion circuit, and a configurable output interface, wherein
  the configurable input interface is arranged to configure a first electrical connection of an input power supply and the power conversion circuit, and is electrically connected with the input power supply and the power conversion circuit;
  the configurable output interface is arranged to configure a second electrical connection of a load and the power conversion circuit, and is electrically connected with the load and the power conversion circuit; and
  the power conversion circuit is arranged to perform corresponding power conversion according to parameters of the input power supply and parameters of the load.

In an embodiment of the present disclosure, there is further provided a power conversion method comprising:
  configuring single-pole double-throw switches K1, K2, K3, and K4, according to parameters of an input power supply and parameters of a load; and
  controlling on/off of triodes in switching groups according to rules corresponding to the parameters of the input power supply and the parameters of the load.

In an embodiment of the present disclosure, there is further provided a power conversion device comprising: at least one processor, at least one memory, and computer program instructions stored in the memory, which when executed by the processor, implement the power conversion method described above.

In an embodiment of the present disclosure, there is further provided a computer-readable storage medium having stored thereon computer program instructions, which when executed by a processor, implement the power conversion method described above.

According to the power conversion method, apparatus, device, and medium provided by the embodiments of the present disclosure, the power conversion apparatus comprises: a configurable input interface, a power conversion circuit, and a configurable output interface, wherein the configurable input interface is arranged to configure a first electrical connection of the input power supply and the power conversion circuit, and is electrically connected with the input power supply and the power conversion circuit; the configurable output interface is arranged to configure a second electrical connection of a load and the power conversion circuit, and is electrically connected with the load and the power conversion circuit; and the power conversion circuit is arranged to perform corresponding power conversion according to parameters of the input power supply and parameters of the load, so that the problem of poor universality of the power conversion apparatus in the related art is solved, and the universality of the power conversion apparatus is improved.

BRIEF DESCRIPTION OF THE DRAWINGS

The accompanying drawings described herein are used for providing a further understanding of this disclosure and constitute a part of the present application, and the disclosed illustrative embodiments, together with the description thereof, serve to explain but not to limit improperly the present disclosure. In the accompanying drawings.

DETAILED DESCRIPTION

Features and exemplary embodiments of various aspects of the present disclosure will be described in detail below, and in order to make objectives, technical solutions and advantages of the present disclosure more clear and explicit, the present disclosure will be further described in detail below in combination with the accompanying drawings and the embodiments. It should be understood that the specific embodiments described herein are merely illustrative of this disclosure and are not intended to limit it. It will be apparent to one skilled in the art that the present disclosure may be implemented without some of these specific details. The following description of the embodiments is merely intended to provide a better understanding of the present disclosure by illustrating examples thereof.

It should be noted that, in this disclosure, relational terms such as first and second, are used solely to distinguish one entity or operation from another, and do not necessarily require or imply any such actual relation or order between these entities or operations. Also, terms "including," "comprising," or any other variation thereof, are intended to cover a non-exclusive inclusion, such that a process, method, article, or device comprising a series of elements comprises not only those elements, but also other elements not expressly listed, or elements inherent in such a process, method, article, or device. Without further limitation, elements defined by a sentence "comprising . . ." does not exclude that there are additional identical elements in the process, method, article, or device comprising the elements.

Figure 1:
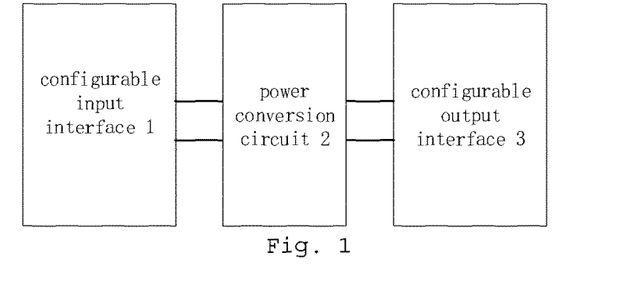
FIG. 1 is a block diagram of a power conversion apparatus according to an embodiment of the present disclosure.

In this embodiment, there is provided a power conversion apparatus. FIG. 1 is a block diagram of a power conversion apparatus according to an embodiment of the present disclosure, and as shown in FIG. 1, the apparatus comprises: a configurable input interface 1, a power conversion circuit 2, and a configurable output interface 3, wherein the configurable input interface 1 is arranged to configure a first electrical connection of an input power supply and the power conversion circuit 2, and is electrically connected with the input power supply and the power conversion circuit 2;

the configurable output interface 3 is arranged to configure a second electrical connection of a load and the power conversion circuit 2, and is electrically connected with the load and the power conversion circuit 2; and the power conversion circuit 2 is arranged to perform corresponding power conversion according to parameters of the input power supply and parameters of the load.

By using the above power conversion apparatus, one configurable input interface and one configurable output interface are used for connecting with the power conversion circuit according to different electrical connections, and the power conversion circuit performs corresponding power conversion according to the parameters of the input power supply and the parameters of the load, so that the power conversion apparatus can adapt to various power conversion requirements of the input power supply and the load on AC voltage, DC voltage, step-up voltage and step-down voltage, which solves the problem of poor universality of a power conversion apparatus in the related art, and improves the universality of the power conversion apparatus.

The above input power supply comprises, but is not limited to: a photovoltaic power generation network, a wind power generation network, an energy storage system, an AC power grid, etc., and the load comprises a DC load and an AC load.

Alternatively, the power conversion performed by the above power conversion circuit comprises at least two of the following: DC/DC step-up conversion, DC/DC step-down conversion, AC/DC conversion, DC/AC conversion, AC/AC conversion, or DC/DC step-up conversion first and then DC/AC conversion. These power conversion functions can be implemented by using a plurality of independent circuits, for example, a DC/DC step-up conversion circuit is a separate one, the DC/DC step-down conversion circuit is a separate one, etc., and these circuits are independent from each other except that their input and output ends are shared through the configurable input interface and the configurable output interface.

Figure 2:
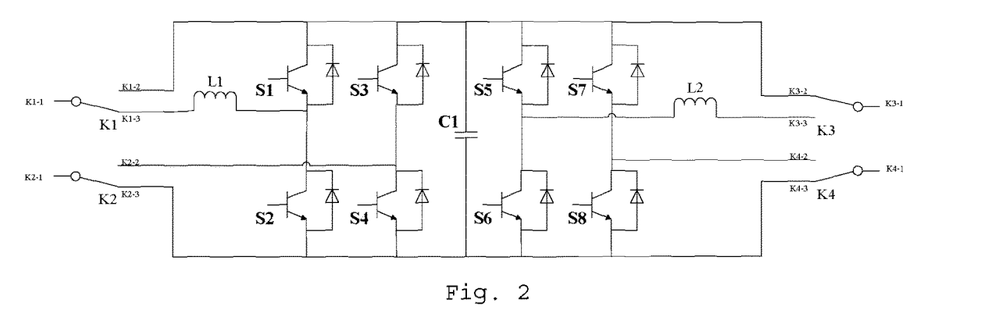
FIG. 2 is a circuit diagram of a power conversion apparatus according to a first alternative embodiment of the present disclosure.

In some embodiments, the power conversion functions described above in the embodiment are implemented by one circuit. In this embodiment, one power conversion circuit will be adopted for implementing the above power conversion functions, which will be taken as an example for explanation. FIG. 2 is a circuit diagram of a power conversion apparatus according to a first alternative embodiment of the present disclosure, and this embodiment will be described and explained in conjunction with FIG. 2.

Alternatively, the configurable input interface 1 comprises: single-pole double-throw switches K1 and K2, wherein an immovable end K1-1 of the single-pole double-throw switch K1 and an immovable end K2-1 of the single-pole double-throw switch K2 are respectively arranged to be electrically connected with the input power supply; and movable ends K1-2 and K1-3 of the single-pole double-throw switch K1, and movable ends K2-2 and K2-3 of the single-pole double-throw switch K2 are respectively arranged to be electrically connected with four input ends of the power conversion circuit, wherein the movable ends K1-2, K1-3, K2-2 and K2-3 are electrically connected with the input ends IN1, IN2, IN3 and IN4 of the power conversion circuit, respectively.

Alternatively, the configurable output interface 3 comprises: single-pole double-throw switches K3 and K4, wherein an immovable end K3-1 of the single-pole double-throw switch K3 and an immovable end K4-1 of the single-pole double-throw switch K4 are respectively arranged to be electrically connected with the load; and movable ends K3-2 and K3-3 of the single-pole double-throw switch K3, and movable ends K4-2 and K4-3 of the single-pole double-throw switch K4 are respectively arranged to be electrically connected with four output ends of the power conversion circuit, wherein the movable ends K3-2, K3-3, K4-2 and K4-3 are electrically connected with the output ends OUT1, OUT2, OUT3 and OUT4 of the power conversion circuit, respectively.

In some embodiments, the single-pole double-throw switch is a relay or contactor, so as to realize automatic circuit control.

Alternatively, the power conversion circuit 2 comprises: input ends IN1, IN2, IN3, and IN4, output ends OUT1, OUT2, OUT3, and OUT4, switching groups S1, S2, S3, S4, S5, S6, S7, and S8, inductors L1 and L2, and a capacitor C, wherein the input end IN1 is electrically connected with the output end OUT1; the input end IN4 is electrically connected with the output end OUT4; the switching groups S1 and S2 that are connected in series in a same direction, the switching groups S3 and S4 that are connected in series in a same direction, the capacitor C, the switching groups S5 and S6 that are connected in series in a same direction, and the switching groups S7 and SB that are connected in series in a same direction are connected in parallel between the input ends IN1 and IN4; the inductor L1 is connected in series between the input end IN2 and a series connection node of the switching groups S1 and S2; the inductor L2 is connected in series between the output end OUT2 and a series connection node of the switching groups S5 and S6; the input end IN3 is electrically connected with a serial connection node of the switching groups S3 and S4; the output end OUT3 is electrically connected with a serial connection node of the switching groups S7 and SB; wherein each switching group includes: a triode and a diode that are connected in anti-parallel.

Figure 3:
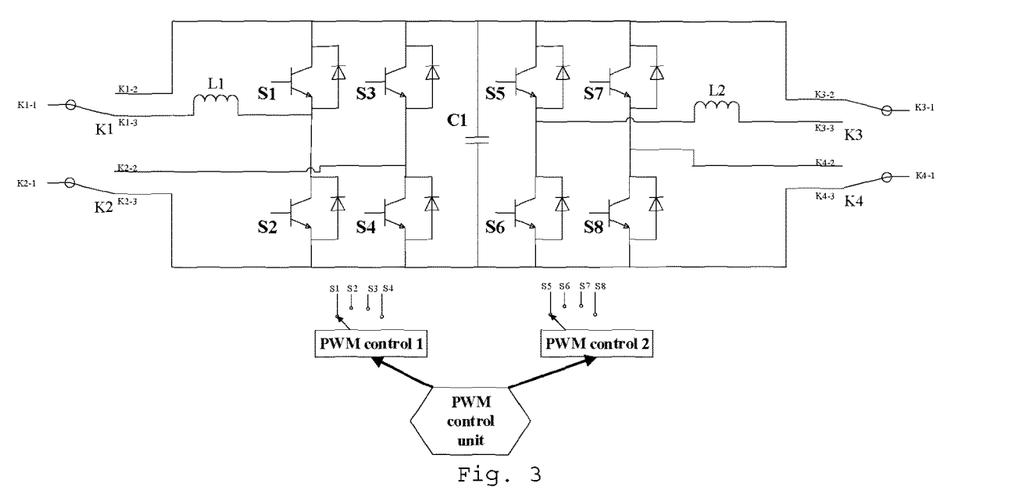
FIG. 3 is a circuit diagram of a power conversion apparatus according to a second alternative embodiment of the present disclosure.

With reference to FIG. 3, alternatively, the power conversion circuit 2 further comprises: a PWM control unit, arranged to control on/off of the triodes in the switching groups according to rules corresponding to the combination of the first electrical connection and the second electrical connection.

Figure 4:
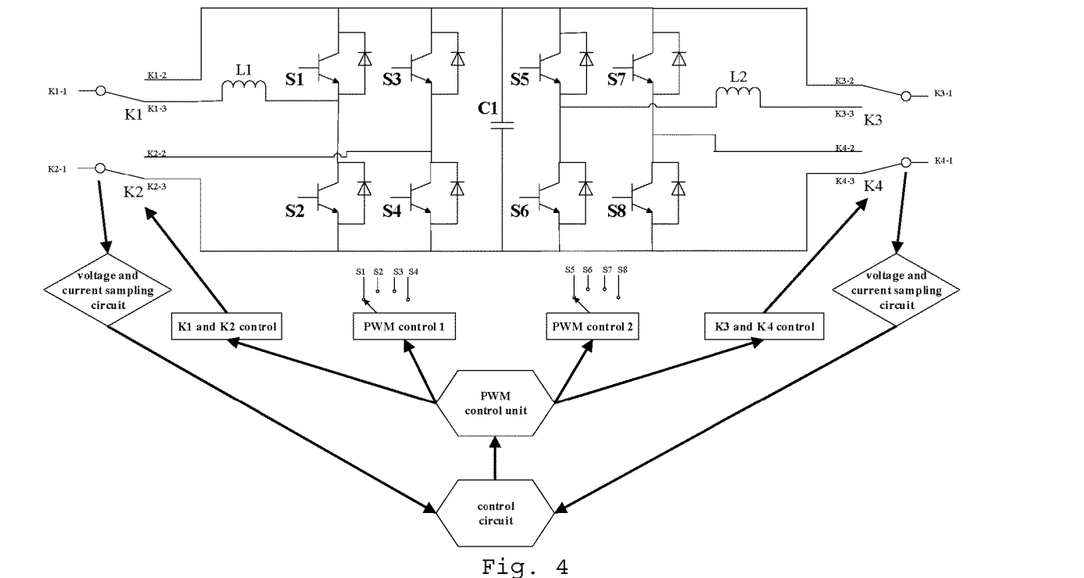
FIG. 4 is a circuit diagram of a power conversion apparatus according to a third alternative embodiment of the present disclosure.

With reference to FIG. 4, alternatively, the power conversion circuit 2 further comprises other peripheral circuits, arranged to implement functions such as automatic control of the single-pole double-throw switches K1 to K4, and voltage and current sampling of the input interface and the output interface.

Through the above power conversion apparatus, the use of one circuit can realize a variety of power conversion, which greatly reduces the volume of the apparatus.

A control method of the above power conversion apparatus, i.e., a power conversion method, will be described and explained below.

Figure 5:
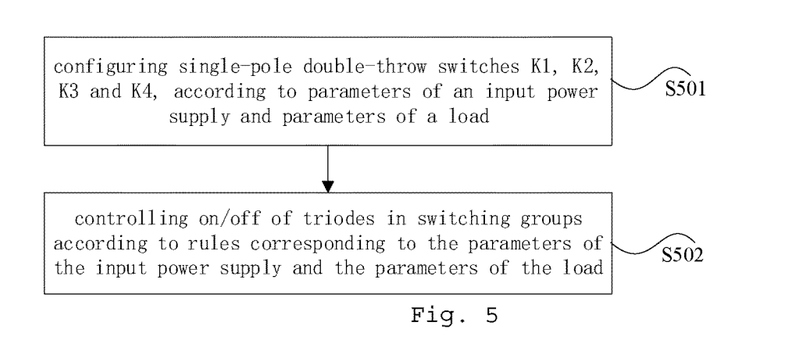
FIG. 5 is a flow diagram of a power conversion method according to an embodiment of the present disclosure.

FIG. 5 is a flow diagram of a power conversion method according to an embodiment of the present disclosure, and as shown in FIG. 5, the method comprises:

step S501, configuring single-pole double-throw switches K1, K2, K3 and K4, according to parameters of an input power supply and parameters of a load; and step S502, controlling on/off of triodes in switching groups according to rules corresponding to the parameters of the input power supply and the parameters of the load.

With respect to different power conversion requirements, the single-pole double-throw switches K1 to K4 are configured differently, and on/off control rules of the triodes in the switching groups S1 to S8 are also different, which will be separately described with reference to FIG. 3.

Alternatively, under the condition that the input power supply is a DC power supply, the load is a DC load, and the voltage required by the load is higher than that of the input power supply, it is configured that the immovable end K1-1 of the single-pole double-throw switch K1 is connected with the movable end K1-3, the immovable end K2-1 of the single-pole double-throw switch K2 is connected with the movable end K2-3, the immovable end K3-1 of the single-pole double-throw switch K3 is connected with the movable end K3-2, and the immovable end K4-1 of the single-pole double-throw switch K4 is connected with the movable end K4-3; and locking of the triodes in the switching groups S1, S3, S4, S5, S6, S7 and S8 is controlled, and on/off of the triodes in the switching group S2 is controlled according to a preset frequency. At this time, a DC step-up circuit is constituted.

Alternatively, under the condition that the input power supply is a DC power supply, the load is a DC load, and voltage required by the load is lower than that of the input power supply, it is configured that the immovable end K1-1 of the single-pole double-throw switch K1 is connected with the movable end K1-2, the immovable end K2-1 of the single-pole double-throw switch K2 is connected with the movable end K2-3, the immovable end K3-1 of the single-pole double-throw switch K3 is connected with the movable end K3-3, and the immovable end K4-1 of the single-pole double-throw switch K4 is connected with the movable end K4-3; locking of the triodes in the switching groups S1, S2, S3, S4, S6, S7 and S8 is controlled, and on/off of the triodes in the switching group S5 is controlled according to a preset frequency. At this time, a DC step-down circuit is constituted.

Alternatively, under the condition that the input power supply is an AC power supply and the load is a DC load, it is configured that the immovable end K1-1 of the single-pole double-throw switch K1 is connected with the movable end K1-3, the immovable end K2-1 of the single-pole double-throw switch K2 is connected with the movable end K2-2, the immovable end K3-1 of the single-pole double-throw switch K3 is connected with the movable end K3-2, and the immovable end K4-1 of the single-pole double-throw switch K4 is connected with the movable end K4-3; locking of the triodes in the switching groups S5, S6, S7 and S8 is controlled, and on/off of the triodes in the switching groups S1, S2, S3 and S4 is controlled according to a preset frequency. At this time, a controllable rectifier circuit is constituted.

Alternatively, under the condition that the input power supply is a DC power supply and the load is an AC load, it is configured that the immovable end K1-1 of the single-pole double-throw switch K1 is connected with the movable end K1-2, the immovable end K2-1 of the single-pole double-throw switch K2 is connected with the movable end K2-3, the immovable end K3-1 of the single-pole double-throw switch K3 is connected with the movable end K3-3, and the immovable end K4-1 of the single-pole double-throw switch K4 is connected with the movable end K4-2; locking of the triodes in the switching groups S1, S2, S3 and S4 is controlled, and on/off of the triodes in the switching groups S5, S6, S7 and S8 is controlled according to a preset frequency. At this time, an inverter circuit is constituted.

Alternatively, under the condition that the input power supply is an AC power supply and the load is an AC load, it is configured that the immovable end K1-1 of the single-pole double-throw switch K1 is connected with the movable end K1-3, the immovable end K2-1 of the single-pole double-throw switch K2 is connected with the movable end K2-2, the immovable end K3-1 of the single-pole double-throw switch K3 is connected with the movable end K3-3, and the immovable end K4-1 of the single-pole double-throw switch K4 is connected with the movable end K4-2; on/off of the triodes in the switching groups S1, S2, S3, S4, S5, S6, S7 and S8 is controlled according to a preset frequency. At this time, the switching groups S1, S2, S3, S4, and other elements constitute a controllable rectifier circuit, and the switching groups S5, S6, S7, S8, and other elements constitute an inverter circuit.

Alternatively, under the condition that the input power supply is a DC power supply, the load is an AC load, and voltage required by the load is step-up, it is configured that the immovable end K1-1 of the single-pole double-throw switch K1 is connected with the movable end K1-3, the immovable end K2-1 of the single-pole double-throw switch K2 is connected with the movable end K2-3, the immovable end K3-1 of the single-pole double-throw switch K3 is connected with the movable end K3-3, and the immovable end K4-1 of the single-pole double-throw switch K4 is connected with the movable end K4-2; locking of the triodes in the switching groups S1, S3 and S4 is controlled, and on/off of the triodes in the switching groups S2, S5, S6, S7 and S8 is controlled according to a preset frequency. At this time, the switching groups S1, S2, S3, S4, and other elements constitute a step-up circuit, and the switching groups, S5, S6, S7, S8, and other elements constitute an inverter circuit.

Alternatively, in order to realize automatic configuration of the configurable input interface and the configurable output interface, current sampling and voltage sampling of the configurable input interface and the configurable output interface can be performed; and the parameters of the input power supply and the parameters of the load are determined according to the current sampling and the voltage sampling. The parameters of the power supply and the parameters of the load include: DC/AC type of the power supply and the load, and whether the voltage required by the load needs step-up/step-down.

In addition, for a traditional power conversion apparatus, since its input and output have fixed configurable properties, it can be only provided that the input is connected to AC or DC and the output is AC or DC; and the input end and output end are strictly configured and cannot be used universally, and a great number of skilled technicians are required to guide field installation and debugging. However, with respect to the power conversion apparatus with the circuit configuration shown in FIG. 2 of this embodiment, since the left and right circuit configuration thereof is completely consistent, its input end and output end do not need to be defined compulsorily, and can be used universally.

Through the implementations described above, those skilled in the art can clearly understand that the method according to the foregoing embodiments can be implemented by means of software plus necessary general hardware platforms, and of course, can also be implemented by means of hardware, but in many cases, the former is a better implementation. Based on such understanding, the technical solutions of the present disclosure in essence, or its part contributing to the prior art can be embodied in the form of a software product, and the computer product is stored in a storage medium (such as a ROM/RAM, a magnetic disk, and an optical disk), and contains certain instructions for enabling a terminal device (which can be a mobile phone, a computer, a server, or a network device, etc.) to perform the method according to the embodiments of the present disclosure.

Figure 6:
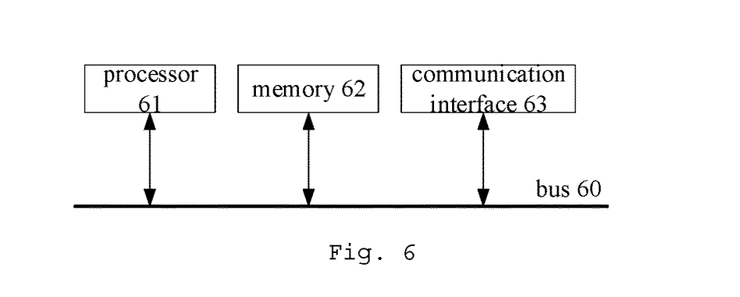
FIG. 6 is a schematic hardware diagram of a power conversion device according to an embodiment of the disclosure.

In addition, the power conversion method according to the embodiments of the present disclosure described in conjunction with FIG. 5 can be implemented by a power conversion device. FIG. 6 shows a schematic hardware diagram of a power conversion device provided according to an embodiment of the present disclosure. As shown in FIG. 6, the power conversion device can include a processor 61 and a memory 62 having stored thereon computer program instructions.

Specifically, the processor 61 can include a Central Processing Unit (CPU), or an Application Specific Integrated Circuit (ASIC), or can be configured to be one or more integrated circuits to implement the embodiments of the present disclosure.

The memory 62 can include a mass memory to data or instructions. By way of example but not limitation, the memory 62 can include a Hard Disk Drive (HDD), a floppy Disk Drive, a flash memory, an optical disk, a magneto-optical disk, a magnetic tape, or a Universal Serial Bus (USB) Drive or a combination of two or more of these. The memory 62 can include removable or non-removable (or fixed) media, where appropriate. The memory 62 can be internal or external to a data processing apparatus, where appropriate. In a particular embodiment, the memory 62 is a non-volatile solid-state memory. In a particular embodiment, the memory 62 includes a Read Only Memory (ROM). Where appropriate, the ROM can be a mask-programmed ROM, Programmable ROM (PROM), Erasable PROM (EPROM), Electrically Erasable PROM (EEPROM), Electrically Alterable ROM (EAROM), or flash memory or a combination of two or more of these.

The processor 61 reads and executes the computer program instructions stored in the memory 62, to implement any of the power conversion methods in the above embodiments.

In one example, the power conversion device can further comprise a communication interface 63 and a bus 60. As shown in FIG. 6, the processor 61, the memory 62, and the communication interface 63 connect and communicate with each other via the bus 60.

The communication interface 63 is mainly arranged to implement communication between modules, apparatuses, units and/or devices in the embodiments of the present disclosure.

The bus 60 includes hardware, software, or both, and couples components of the power conversion device with each other. By way of example but not limitation, a bus can include an Accelerated Graphics Port (AGP) or other graphics bus, an Enhanced Industrial Standard Architecture (EISA) bus, a Front Side Bus (FSB), a Hyper Transport (HT) interconnect, an Industrial Standard Architecture (ISA) bus, an InfiniBand interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus, or other suitable buses, or a combination of two or more of these. The bus 60 can include one or more buses, where appropriate. Any suitable bus or interconnect will be considered in this disclosure, although a particular bus is described and illustrated in the embodiments thereof.

The power conversion device can perform the power conversion method in the embodiments of the present disclosure based on the acquired data, thereby implementing the power conversion method described in conjunction with FIG. 5.

In addition, in combination with the power conversion method in the foregoing embodiments, the embodiments of the present disclosure can provide a computer-readable storage medium for implementing the method. The computer readable storage medium has stored thereon computer program instructions, which, when executed by a processor, implement the power conversion method in any of the above embodiments.

The above description only describes the preferred embodiments of the present disclosure and is not intended to limit the present disclosure. For those skilled in the art, various modifications and variations can be made to the present disclosure. Any modification, equivalent substitution, improvement, etc., made within the spirit and principle of the present disclosure should be contained within the protection scope of the present disclosure.

What is claimed is:

1. A power conversion apparatus comprising:
   a configurable input interface;
   a power conversion circuit; and
   a configurable output interface,
   wherein the configurable input interface is arranged to configure a first electrical connection of an input power supply and the power conversion circuit, and is electrically connected with the input power supply and the power conversion circuit,
   wherein the configurable output interface is arranged to configure a second electrical connection of a load and the power conversion circuit, and is electrically connected with the load and the power conversion circuit, and
   wherein the power conversion circuit is arranged to perform corresponding power conversion according to parameters of the input power supply and parameters of the load, wherein power conversion performed by the power conversion circuit comprises at least two of the following: DC/DC step-up conversion, DC/DC step-down conversion, AC/DC conversion, DC/AC conversion, AC/AC conversion, or DC/DC step-up conversion first and then DC/AC conversion, wherein the configurable input interface comprises single-pole double-throw switches, wherein a first immovable end of a first single-pole double-throw switch and a second immovable end of a second single-pole double-throw switch are respectively arranged to be electrically connected with the input power supply, wherein a first plurality of movable ends of the first single-pole double-throw switch, and a second plurality of movable ends of the second single-pole double-throw switch are respectively arranged to be electrically connected with four input ends of the power conversion circuit, wherein the first and second plurality of movable ends are electrically connected with input ends of the power conversion circuit, respectively, wherein the configurable output interface comprises single-pole double-throw switches, wherein a third immovable end of a third single-pole double-throw switch and a fourth immovable end of a fourth single-pole double-throw switch are respectively arranged to be electrically connected with the load, wherein a third plurality of movable ends of the third single-pole double-throw switch, and a fourth plurality of movable ends of the fourth single-pole double-throw switch are respectively arranged to be electrically connected with four output ends of the power conversion circuit, wherein the third and fourth plurality of movable ends are electrically connected with output ends of the power conversion circuit, respectively, wherein the power conversion circuit comprises a first input end, a second input end, a third input end, and a fourth input end, a first output end, a second output end, a third output end, and a fourth output end, a first switching group, a second switching group, a third switching group, a fourth switching group, a fifth switching group, a sixth switching group, a seventh switching group and an eighth switching group, a first inductor and a second inductor, and a capacitor, wherein the first input end is electrically connected with the first output end, wherein the fourth input end is electrically connected with the fourth output end, wherein the first switching group and the second switching group that are connected in series in a same direction, the third switching group and the fourth switching group that are connected in series in a same direction, the capacitor, the fifth switching group and the sixth switching group that are connected in series in a same direction, and the seventh switching group and the eighth switching group that are connected in series in a same direction are connected in parallel between the first input end and the fourth input end, wherein the first inductor is connected in series between the second input end and a series connection node of the first switching group and the second switching group, wherein the second inductor is connected in series between the second output end and a series connection node of the fifth switching group and the sixth switching group, wherein the third input end is electrically connected with a serial connection node of the third switching group and the fourth switching group, wherein the third output end is electrically connected with a serial connection node of the seventh switching group and the eighth switching group, and wherein each of the switching groups includes a triode and a diode that are connected in anti-parallel.

2. The apparatus according to claim 1, wherein the power conversion circuit further comprises: a PWM control unit, arranged to control on/off of triodes in the switching groups according to the parameters of the input power supply and the parameters of the load.

3. A power conversion method performed by a power conversion apparatus including:
a configurable input interface;
a power conversion circuit; and
a configurable output interface,
wherein the configurable input interface is arranged to configure a first electrical connection of an input power supply and the power conversion circuit, and is electrically connected with the input power supply and the power conversion circuit,
wherein the configurable output interface is arranged to configure a second electrical connection of a load and the power conversion circuit, and is electrically connected with the load and the power conversion circuit, and
wherein the power conversion circuit is arranged to perform corresponding power conversion according to parameters of the input power supply and parameters of the load,
wherein power conversion performed by the power conversion circuit comprises at least two of the following: DC/DC step-up conversion, DC/DC step-down conversion, AC/DC conversion, DC/AC conversion, AC/AC conversion, or DC/DC step-up conversion first and then DC/AC conversion,
wherein the configurable input interface comprises single-pole double-throw switches,
wherein a first immovable end of a first single-pole double-throw switch and a second immovable end of a second single-pole double-throw switch are respectively arranged to be electrically connected with the input power supply,
wherein a first plurality of movable ends of the first single-pole double-throw switch, and a second plurality of movable ends of the second single-pole double-throw switch are respectively arranged to be electrically connected with four input ends of the power conversion circuit,
wherein the first and second plurality of movable ends are electrically connected with input ends of the power conversion circuit, respectively,
wherein the configurable output interface comprises single-pole double-throw switches,
wherein a third immovable end of a third single-pole double-throw switch and a fourth immovable end of a fourth single-pole double-throw switch are respectively arranged to be electrically connected with the load,
wherein a third plurality of movable ends of the third single-pole double-throw switch, and a fourth plurality of movable ends of the fourth single-pole double-throw switch are respectively arranged to be electrically connected with four output ends of the power conversion circuit, wherein the third and fourth plurality of movable ends are electrically connected with output ends of the power conversion circuit, respectively, wherein the power conversion circuit comprises a first input end, a second input end, a third input end, and a fourth input end, a first output end, a second output end, a third output end, and a fourth output end, a first switching group, a second switching group, a third switching group, a fourth switching group, a fifth switching group, a sixth switching group, a seventh switching group, and an eighth switching group, a first inductor and a second inductor, and a capacitor, wherein the first input end is electrically connected with the first output end, wherein the fourth input end is electrically connected with the fourth output end, wherein the first switching group and the second switching group that are connected in series in a same direction, the third switching group and the fourth switching group that are connected in series in a same direction, the capacitor, the fifth switching group and the sixth switching group that are connected in series in a same direction, and the seventh switching group and the eighth switching group that are connected in series in a same direction are connected in parallel between the first input end and the fourth input end, wherein the first inductor is connected in series between the second input end and a series connection node of the first switching group and the second switching group, wherein the second inductor is connected in series between the second output end and a series connection node of the fifth switching group and the sixth switching group, wherein the third input end is electrically connected with a serial connection node of the third switching group and the fourth switching group, wherein the third output end is electrically connected with a serial connection node of the seventh switching group and the eighth switching group, and wherein each of the switching groups includes a triode and a diode that are connected in anti-parallel, comprising:

configuring the first single-pole double-throw switch, the second single-pole double-throw switch, the third single-pole double-throw switch, and the fourth single-pole double-throw switch, according to parameters of an input power supply and parameters of a load; and controlling on/off of triodes in switching groups according to the parameters of the input power supply and the parameters of the load.

4. The method according to claim 3, wherein under a condition that the input power supply is a DC power supply, the load is a DC load, and voltage required by the load is higher than that of the input power supply, the method comprises:

configuring the first immovable end of the single-pole double-throw switch to be connected with a first movable end, the second immovable end of the single-pole double-throw switch to be connected with a second movable end, the third immovable end of the single-pole double-throw switch to be connected with a third movable end, and the fourth immovable end of the single-pole double-throw switch to be connected with a fourth movable end; and controlling locking on of the triodes in the first, third, fourth, fifth, sixth, seventh and eighth switching groups, and controlling on/off of the triodes in the second switching group according to a preset frequency.

5. The method according to claim 3, wherein under a condition that the input power supply is a DC power supply, the load is a DC load, and voltage required by the load is lower than that of the input power supply, the method comprises:

configuring the first immovable end of the first single-pole double-throw switch to be connected with a first movable end, the second immovable end of the second single-pole double-throw switch to be connected with a second movable end, the third immovable end of the third single-pole double-throw switch to be connected with a third movable end, and the fourth immovable end of the single-pole double-throw switch to be connected with a fourth movable end; and controlling locking on of the triodes in the first, second, third, fourth, sixth, seventh and eighth switching groups, and controlling on/off of the triodes in the fifth switching group according to a preset frequency.

6. The method according to claim 3, wherein under a condition that the input power supply is an AC power supply and the load is a DC load, the method comprises:

configuring the first immovable end of the single-pole double-throw switch to be connected with a first movable end, the second immovable end of the single-pole double-throw switch to be connected with a second movable end, the third immovable end of the single-pole double-throw switch to be connected with a third movable end, and the fourth immovable end of the single-pole double-throw switch to be connected with a fourth movable end; and controlling locking on of the triodes in the fifth, sixth, seventh and eighth switching groups, and controlling on/off of the triodes in the first, second, third, and fourth switching groups according to a preset frequency.

7. The method according to claim 3, wherein under a condition that the input power supply is a DC power supply and the load is an AC load, the method comprises:

configuring the first immovable end of the single-pole double-throw switch to be connected with a first movable end, the second immovable end of the single-pole double-throw switch to be connected with a second movable end, the third immovable end of the single-pole double-throw switch to be connected with a third movable end, and the fourth immovable end of the single-pole double-throw switch to be connected with a fourth movable end; and controlling locking on of the triodes in the first, second, third, and fourth switching groups, and controlling on/off of the triodes in the fifth, sixth, seventh and eighth switching groups according to a preset frequency.

8. The method according to claim 3, wherein under a condition that the input power supply is an AC power supply and the load is an AC load, the method comprises:

configuring the first immovable end of the single-pole double-throw switch to be connected with a first movable end, the second immovable end of the single-pole double-throw switch to be connected with a second movable end, the third immovable end of the single-pole double-throw switch to be connected with a third movable end, and the fourth immovable end of the single-pole double-throw switch to be connected with a fourth movable end; and controlling on/off of the triodes of the first, second, third, fourth, fifth, sixth, seventh and eighth switching groups according to a preset frequency.

9. The method according to claim 3, wherein under a condition that the input power supply is a DC power supply, the load is an AC load, and voltage required by the load is step-up, the method comprises:

configuring the first immovable end of the single-pole double-throw switch to be connected with a first movable end, the second immovable end of the single-pole double-throw switch to be connected with a second movable end, the third immovable end of the single-pole double-throw switch to be connected with a third movable end, and the fourth immovable end of the single-pole double-throw switch to be connected with a fourth movable end; and controlling locking on of the triodes in the first, third, and fourth switching groups, and controlling on/off of the triodes in the second, fifth, sixth, seventh and eighth switching group according to a preset frequency.

10. The method according to claim 3, further comprising:

performing current sampling and voltage sampling of configurable input interface and configurable output interface; and determining the parameters of the input power supply and the parameters of the load according to the current sampling and the voltage sampling.

11. A power conversion device comprising:

at least one processor; and at least one non-transitory memory storing computer program instructions, which when executed by the processor, implement the power conversion method according to claim 3.

12. A non-transitory computer-readable storage medium having stored thereon computer program instructions, which when executed by a processor, implement the power conversion method according to claim 3.

* * * * *